(12) United States Patent
Mizutani

(10) Patent No.: US 8,782,901 B2
(45) Date of Patent: Jul. 22, 2014

(54) DYNAMIC BEARING DEVICE

(75) Inventor: Toshiyuki Mizutani, Kuwana (JP)

(73) Assignee: NTN Corporation, Osaka-fu (JP)

( * ) Notice: Subject to any disclaimer, the term of this patent is extended or adjusted under 35 U.S.C. 154(b) by 0 days.

(21) Appl. No.: 13/373,883

(22) Filed: Dec. 5, 2011

(65) Prior Publication Data

US 2012/0073139 A1  Mar. 29, 2012

Related U.S. Application Data

(62) Division of application No. 11/547,641, filed as application No. PCT/JP2005/006847 on Apr. 7, 2005, now abandoned.

(30) Foreign Application Priority Data

| Apr. 9, 2004 | (JP) | ................................. 2004-115695 |
| Apr. 9, 2004 | (JP) | ................................. 2004-115704 |
| Jan. 25, 2005 | (JP) | ................................. 2005-017068 |

(51) Int. Cl.
*F16C 32/06* (2006.01)

(52) U.S. Cl.
USPC ................ 29/898.02; 29/898.061; 29/898.09; 29/898.11

(58) Field of Classification Search
USPC ........... 29/898.02, 898.04, 898.041, 898.042, 29/898.061, 898.062, 898.09, 898.1, 29/898.11
See application file for complete search history.

(56) References Cited

U.S. PATENT DOCUMENTS

| 5,097,164 | A | 3/1992 | Nnakasugi et al. |
| 5,372,432 | A | 12/1994 | Ishikawa |
| 5,558,445 | A | 9/1996 | Chen et al. |
| 6,243,230 | B1 | 6/2001 | Nii et al. |
| 6,250,807 | B1 | 6/2001 | Mori et al. |
| 6,322,252 | B1 | 11/2001 | Grantz et al. |
| 6,390,681 | B1 * | 5/2002 | Nakazeki et al. ............. 384/107 |
| 6,921,208 | B2 | 7/2005 | Yamashita et al. |
| 6,939,046 | B2 | 9/2005 | Oelsch |
| 6,966,699 | B2 | 11/2005 | Satoh |
| 2001/0021080 | A1 | 9/2001 | Nii et al. |

(Continued)

FOREIGN PATENT DOCUMENTS

| CN | 1450281 A | 10/2003 |
| EP | 1365164 A2 * | 11/2003 |

(Continued)

OTHER PUBLICATIONS

Chinese Office Action issued Jan. 4, 2008 in Chinese Application No. 200580012233.2.

(Continued)

*Primary Examiner* — Christopher Besler

(74) *Attorney, Agent, or Firm* — Wenderoth, Lind & Ponack, L.L.P.

(57) ABSTRACT

A seal member is fixed to a predetermined position on an outer peripheral surface of a shaft portion. During rotation of a shaft member, a lower end surface of the seal member is opposed to an upper end surface of a bearing sleeve through an intermediation of a thrust bearing gap to form a second thrust bearing gap. An outer peripheral surface of the seal member defines between itself and an inner peripheral surface of an upper end portion of a housing a seal space having a predetermined volume.

4 Claims, 11 Drawing Sheets

(56) References Cited

U.S. PATENT DOCUMENTS

| | | |
|---|---|---|
| 2002/0018315 A1 | 2/2002 | Nii et al. |
| 2003/0169952 A1* | 9/2003 | Yamashita et al. ............ 384/107 |
| 2004/0013329 A1 | 1/2004 | Yamashita et al. |
| 2005/0094906 A1 | 5/2005 | Satoh |

FOREIGN PATENT DOCUMENTS

| | | |
|---|---|---|
| JP | 6-28336 | 4/1994 |
| JP | 8-184322 | 7/1996 |
| JP | 11-283321 | 10/1999 |
| JP | 2000-87953 | 3/2000 |
| JP | 2001-41253 | 2/2001 |
| JP | 2001-271828 | 10/2001 |
| JP | 2002-339956 | 11/2002 |
| JP | 2002-369446 | 12/2002 |
| JP | 2003-56555 | 2/2003 |
| JP | 2003-65324 | 3/2003 |
| JP | 3094210 | 3/2003 |
| JP | 2003-148498 | 5/2003 |
| JP | 2003-166524 | 6/2003 |
| JP | 2003-172336 | 6/2003 |
| JP | 2003-239974 | 8/2003 |
| JP | 2003-305616 | 10/2003 |
| JP | 2003-336636 | 11/2003 |

OTHER PUBLICATIONS

International Preliminary Report on Patentability and Written Opinion of the International Searching Authority issued Oct. 19, 2006 in corresponding International Application No. PCT/JP2005/006847.

* cited by examiner

FIG. 6
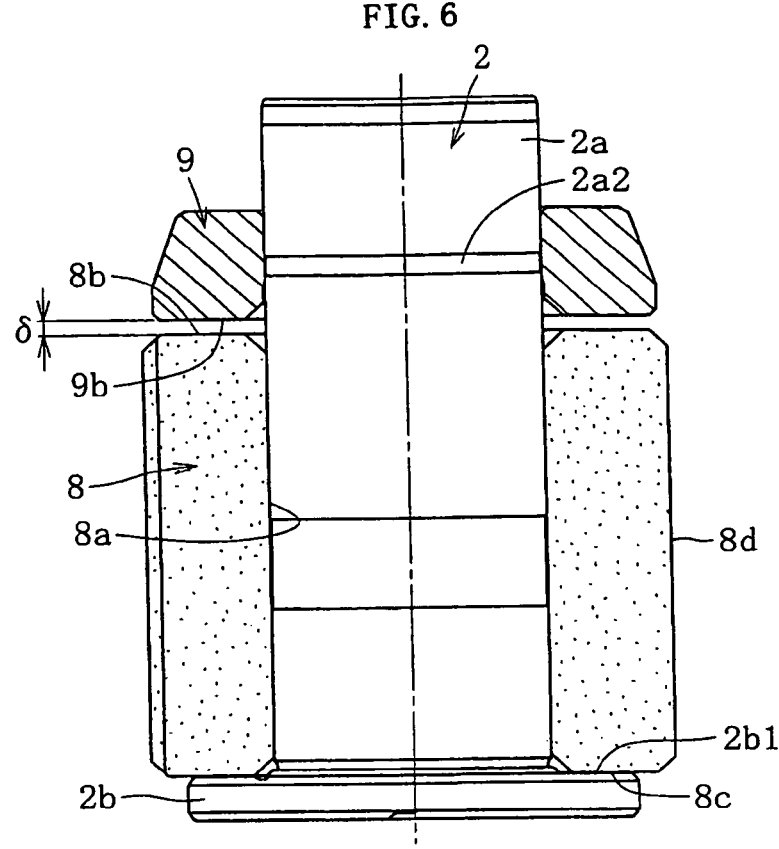
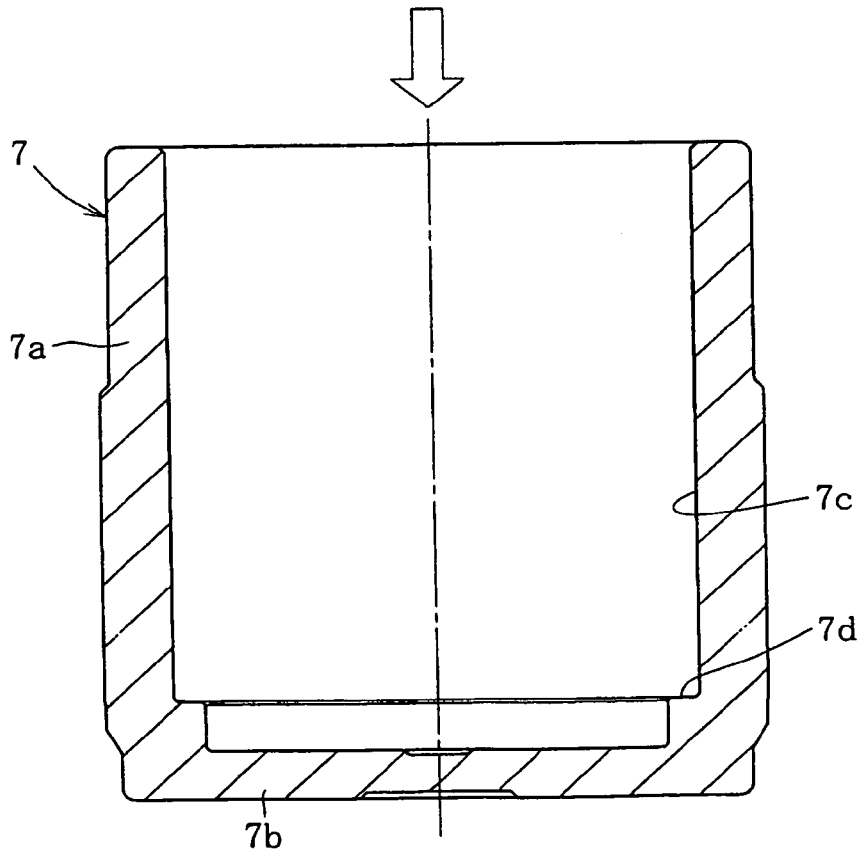

FIG. 9
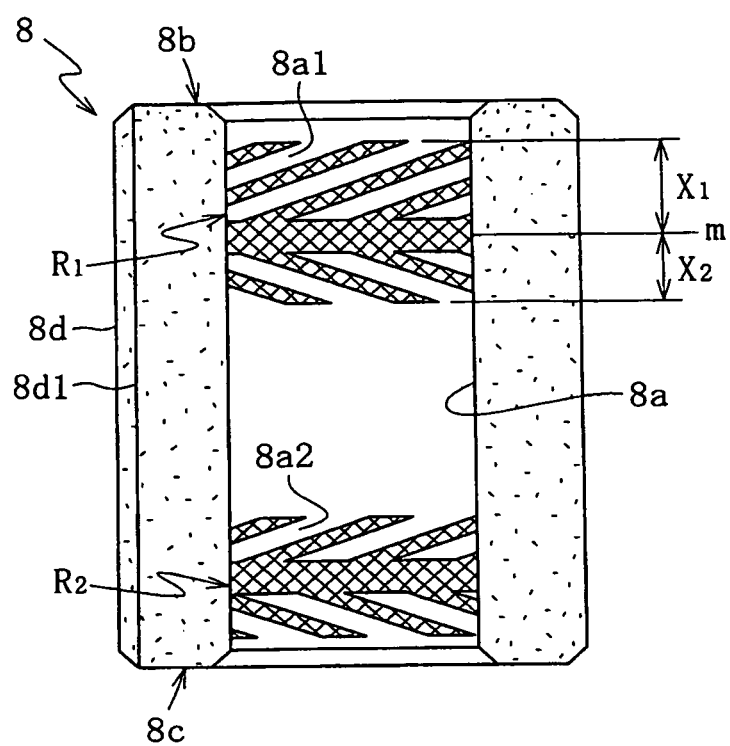
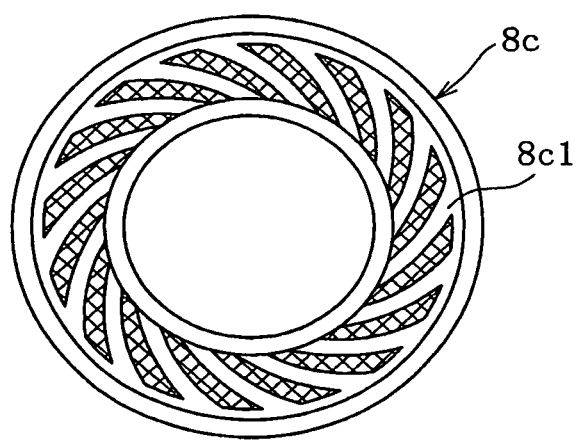

DYNAMIC BEARING DEVICE

CROSS-REFERENCE TO RELATED APPLICATION

This application is a divisional of U.S. application Ser. No. 11/547,641, filed Oct. 5, 2006, which is a National Stage application of PCT/JP2005/006847, filed Apr. 7, 2005, the entireties of which are incorporated herein by reference.

BACKGROUND OF THE INVENTION

1. Field of the Invention

The present invention relates to a dynamic bearing device for supporting a rotary member in a non-contact manner by a dynamic pressure action of a fluid (i.e., lubricating fluid) generated in a bearing gap. The dynamic bearing device is suitable for use in: a spindle motor for an information apparatus, for example, a magnetic disk device, such as an HDD or an FDD, an optical disk device, such as a CD-ROM, a CD-R/RW, or a DVD-ROM/RAM, or a magneto-optical disk device, such as an MD or MO; a polygon scanner motor for a laser beam printer (LBP); or a small motor for an electrical apparatus such as an axial fan.

2. Description of the Related Art

Apart from high rotational accuracy, an improvement in speed, a reduction in cost, a reduction in noise, etc. are required of the various motors mentioned above. One of the factors determining such the requisite performances is a bearing for supporting a spindle of the motor. Recently, as a bearing of this type, use of a dynamic bearing superior in the above-mentioned requisite performances has been considered, or such the dynamic bearing has been actually put into practical use.

For example, in a dynamic bearing device to be incorporated into the spindle motor of a disk drive apparatus, such as an HDD, there are provided a radial bearing portion supporting a shaft member radially in a non-contact manner and a thrust bearing portion supporting the shaft member in a thrust direction in a non-contact manner. As the radial bearing portion, there is used a dynamic bearing provided with grooves (i.e., dynamic pressure grooves) for dynamic pressure generation provided in an inner peripheral surface of a bearing sleeve or in an outer peripheral surface of the shaft member. As the thrust bearing portion, there is used a dynamic bearing provided with dynamic pressure grooves in, for example, both end surfaces of a flange portion of the shaft member or in surfaces opposed thereto (e.g., an end surface of the bearing sleeve and an end surface of a thrust member fixed to a housing (see, for example, Patent Documents 1 and 2). Alternatively, as the thrust bearing portion, there may be used a bearing (i.e., a so-called pivot bearing) of a structure in which one end surface of the shaft member is contact-supported by a thrust plate (see, for example, FIG. 4 of Patent Document 2).

In general, the bearing sleeve is fixed to a predetermined position of an inner periphery of the housing and, to prevent leakage of the fluid (e.g., a lubricating oil) poured into an inner space of the housing to the outside, a seal member is arranged at an opening of the housing in many cases. The inner peripheral surface of the seal member defines a seal space between itself and the outer peripheral surface of the shaft member, and the volume of the seal space is set to be larger than the amount by which the lubricating oil filling the inner space of the housing undergoes a change in volume through thermal expansion/contraction within a temperature range of use. Thus, even when there is a change in the volume of the lubricating oil as a result of a temperature change, an oil level of the lubricant is always maintained within the seal space (see Patent Document 1).

Patent Document 1: JP 2003-65324 A
Patent Document 2: JP 2003-336636 A

As described above, in the conventional dynamic bearing device, the seal space is formed between the inner peripheral surface of the seal member fixed at the opening of the housing and the outer peripheral surface of the shaft member; if the seal space is to have a function to absorb a change in the volume of the lubricating oil due to a temperature change, it is necessary to secure a relatively large axial dimension for the seal space (i.e., the seal member). Thus, from the design standpoint, it is necessary to lower, within the housing, the position of the axial center of the bearing sleeve relatively toward a bottom side of the housing, with the result that the distance between the bearing center of the radial bearing portion and the center of gravity of the rotary member increases, which, depending upon the condition of use, etc., can lead to a shortage of load capacity with respect to a moment load. Further, in a construction in which thrust bearing portions are provided on both sides of the flange portion of the shaft member, the axial distance between the two thrust bearing portions becomes relatively smaller, with the result that the load capacity of the thrust bearing portions with respect to the moment load tends to be so much the lower. In particular, in a case of a dynamic bearing device for use in a disk drive apparatus, as a rotor (i.e., a rotary member to which a rotor hub, a rotor magnet, a disk, a clamper, etc. are assembled) rotates, a relatively large moment load acts on the shaft member, so the moment load resistance is an important characteristic.

Further, in a dynamic bearing of this type, the thrust bearing gap of the thrust bearing portion is under the influence of component precision, assembly precision, etc., so it is difficult to control the thrust bearing gap to a desired value. Under the circumstances, there is nothing for it but to perform a complicated assembly operation.

It is an object of the present invention to make it possible to reduce the axial dimension of the above-mentioned seal space of a dynamic bearing device of this type, thereby enhancing the load capacity of the dynamic bearing device with respect to the moment load or reducing the axial dimension of the dynamic bearing device.

Another object of the present invention is to enhance the load capacity of the thrust bearing portion with respect to the moment load.

Still another object of the present invention is to provide a method which makes it possible to easily set the thrust bearing gaps of a dynamic bearing device of this type with high accuracy.

SUMMARY OF THE INVENTION

To attain the above-mentioned objects, the present invention provides a dynamic bearing device, including: a housing; a bearing sleeve fixed inside the housing; a shaft member making a relative rotation with respect to the housing and the bearing sleeve; a seal member situated at one end of the housing; and a radial bearing portion supporting the shaft member radially in a non-contact manner by a dynamic pressure action of a lubricating oil generated in a radial bearing gap between the bearing sleeve and the shaft member, characterized in that the seal member is provided on the shaft member, with a seal space being provided beside an outer peripheral surface of the seal member.

Here, as the fluid (i.e., lubricating fluid), it is also possible to use a gas, such as air, apart from a liquid, such as a lubricating oil (or lubricating grease) or a magnetic fluid.

In the above-mentioned construction, the seal space is provided between the outer peripheral surface of the seal member provided on the shaft portion and the inner peripheral surface of one end portion of the housing, so, in securing, in the seal space, a volume capable of absorbing a change in volume due to a change in the temperature of the lubricating oil filling the inner space of the housing, it is possible to make the axial dimension of the seal space (i.e., seal member) smaller than that in the prior art. Thus, it is possible to set, within the housing, the axial center position of the bearing sleeve nearer to one end portion of the housing than in the prior art (that is, to arrange the bearing sleeve nearer to one end portion of the housing than in the prior art, or to make the axial dimension of the bearing sleeve larger than that in the prior art), whereby the distance between the bearing center of the radial bearing portion and the center of gravity of the rotary member is reduced, thereby enhancing the load capacity with respect to the moment load. Further, in a case of arranging the bearing sleeve nearer to one end portion of the housing than in the prior art, it is possible to make the axial dimension of the dynamic bearing device smaller than that in the prior art.

TO attain the above-mentioned objects, the present invention further provides a dynamic bearing device, including: a housing; a bearing sleeve fixed inside the housing; a shaft member making a relative rotation with respect to the housing and the bearing sleeve; a seal member situated at one end of the housing; and a radial bearing portion supporting the shaft member radially in a non-contact manner by a dynamic pressure action of a fluid generated in a radial bearing gap between the bearing sleeve and the shaft member, characterized in that the shaft member has a shaft portion inserted into an inner peripheral surface of the bearing sleeve and a flange portion provided on the shaft portion, that the seal member is fixed to the shaft member, with a seal space being defined beside an outer peripheral surface of the seal member, that the dynamic bearing device includes a first thrust bearing portion provided between one end surface of the seal member and one end surface of the bearing sleeve opposed thereto, with the first thrust bearing portion supporting the seal member and the shaft member in a thrust direction in a non-contact manner by a dynamic pressure action of a fluid generated in a thrust bearing gap, and that the dynamic bearing device includes a second thrust bearing portion provided between one end surface of the flange portion and another end surface of the bearing sleeve opposed thereto, with the second thrust bearing portion supporting the shaft member in the thrust direction in a non-contact manner by a dynamic pressure action of the fluid generated in a thrust bearing gap.

In addition to the above-mentioned effects, due to the provision of the first thrust bearing portion and the second thrust bearing portion so as to sandwich the bearing sleeve axially from both sides, the axial distance between the two thrust bearing portions is increased as compared with the construction in which the thrust bearing portions are provided on both sides of the flange portion, and the load capacity of the thrust bearing portions with respect to the moment load is so much the higher.

The fixation of the seal member to the shaft member can be effected by an appropriate fixing means, such as adhesion, a combination of adhesion and press-fitting, or welding (ultrasonic welding). When adopting adhesion (or a combination of adhesion and press-fitting) as the fixing means, it is possible to provide a recess to be filled with adhesive at an adhesion position of at least one of the seal member and the shaft member. The recess may be provided in the form of a circumferential groove or in the form of one or a plurality of recesses arranged circumferentially. The adhesive also fills the recess at the adhesion position and solidifies, whereby the strength with which the seal member is fixed to the shaft member is enhanced.

In the above-mentioned construction, the width (i.e., radial dimension) of the seal space may be axially uniform; however, from the viewpoint of enhancing the sealing property, it is desirable for the seal space to be of a tapered configuration gradually diminished in size toward the interior of the housing. That is, when the seal space has the tapered configuration, the fluid in the seal space is drawn in by capillary attraction in the direction in which the seal space is diminished in size (i.e., toward the interior of the housing). As a result, it is possible to effectively prevent leakage of the fluid from the interior to the exterior of the housing. As means for realizing such the construction, there are available a means for forming, on the outer peripheral surface of the seal member, a tapered surface gradually diminished in diameter toward the exterior of the housing, and a means for forming a tapered surface gradually diminished in diameter toward the exterior of the housing on a surface opposed to the outer peripheral surface of the seal member through the intermediation of the seal space, for example, on the inner peripheral surface of one end portion of the housing. In particular, with the former means, the seal member rotates together with the shaft member, whereby, in addition to the drawing-in action due to the capillary attraction, it is also possible to obtain a drawing-in action due to the centrifugal force during rotation (i.e., a so-called centrifugal seal), so leakage of the fluid from the interior to the exterior of the housing is more effectively prevented.

To attain the above-mentioned objects, the present invention further provides a dynamic bearing device, including: a housing; a bearing sleeve fixed inside the housing; a shaft member making a relative rotation with respect to the housing and the bearing sleeve; a seal member situated at one end of the housing; and a radial bearing portion supporting the shaft member radially in a non-contact manner by a dynamic pressure action of a fluid generated in a radial bearing gap between the bearing sleeve and the shaft member, characterized in that the seal member is provided on the shaft member, that one end surface of the seal member is opposed to one end surface of the bearing sleeve through an intermediation of a thrust bearing gap, and that an outer peripheral surface of the seal member is provided with a tapered surface gradually diminished in diameter toward outside of the housing and facing a seal space.

In the dynamic bearing device constructed as described above, the radial bearing portion may be formed by a dynamic bearing provided with dynamic pressure grooves of an axially inclined configuration, such as a herringbone-like configuration or a spiral configuration, a dynamic bearing (i.e., multi-arc bearing) in which the radial bearing gap is diminished in a wedge-like fashion in one or both circumferential directions, or a dynamic bearing (i.e., step bearing) in which a plurality of dynamic pressure grooves in the form of axial grooves are provided at predetermined circumferential intervals.

The dynamic bearing device constructed as described above can preferably be used as a dynamic bearing device for a spindle motor for use in an information apparatus, such as a disk device.

To attain the above-mentioned objects, the present invention further provides a method of manufacturing a dynamic bearing device, including: a housing; a bearing sleeve fixed inside the housing; a shaft member having a shaft portion inserted into an inner peripheral surface of the bearing sleeve and a flange portion provided on the shaft portion; a seal member fixed to the shaft member; a radial bearing portion supporting the shaft member radially in a non-contact manner by a dynamic pressure action of a fluid generated in a radial bearing gap between an inner peripheral surface of the bearing sleeve and an outer peripheral surface of the shaft member; a first thrust bearing portion supporting the seal member and the shaft member in a thrust direction in a non-contact manner by a dynamic pressure action of the fluid generated in a thrust bearing gap between one end surface of the seal member and one end surface of the bearing sleeve; and a second thrust bearing portion supporting the shaft member in the thrust direction in a non-contact manner by a dynamic pressure action of the fluid generated in a thrust bearing gap between one end surface of the flange portion and another end surface of the bearing sleeve, the method including the steps of: inserting the shaft portion of the shaft member into the inner peripheral surface of the bearing sleeve and attaching the seal member to the shaft portion to thereby interpose the bearing sleeve between the one end surface of the seal member and the one end surface of the flange portion; adjusting, after the step, an axial relative position of the shaft portion and the seal member to define, between the bearing sleeve and the one end surface of the seal member and between the bearing sleeve and the one end surface of the flange portion, gaps of an amount corresponding to a sum total of the thrust bearing gaps of the first thrust bearing portion and the second thrust bearing portion; fixing, after the step, the seal member to the shaft portion; and accommodating an assembly including the bearing sleeve, the shaft member, and the seal member assembled together by the step in the housing.

In the above-mentioned construction, the thrust bearing gaps are set at the stage of previously assembling together the bearing sleeve, the shaft member, and the seal member, so the thrust bearing gaps can easily be set with high accuracy. After the setting of the thrust bearing gaps, the operation of assembling the components to each other is completed when the assembly including the bearing sleeve, the shaft member, and the seal member is accommodated in the housing, thus simplifying the assembling operation.

According to the present invention, it is possible to enhance the load capacity of a dynamic bearing device with respect to the moment load, or to make the axial dimension of a dynamic bearing device compact. Thus, it is possible to achieve a reduction in the size of a spindle motor equipped with the dynamic bearing device for use in an information apparatus, such as a disk device.

Further, according to the present invention, it is possible to enhance the load capacity of the thrust bearing portion with respect to the moment load.

Further, according to the present invention, it is possible to set a thrust bearing gap in a dynamic bearing device of this type easily and with high accuracy.

BRIEF DESCRIPTION OF THE DRAWINGS

FIG. 6 is a diagram illustrating an assembly process.

FIG. 9 is a sectional view of a bearing sleeve and a diagram showing a lower end surface thereof.

DETAILED DESCRIPTION OF THE INVENTION

In the following, an embodiment of the present invention, will be described with reference to the drawings.

Figure 1:
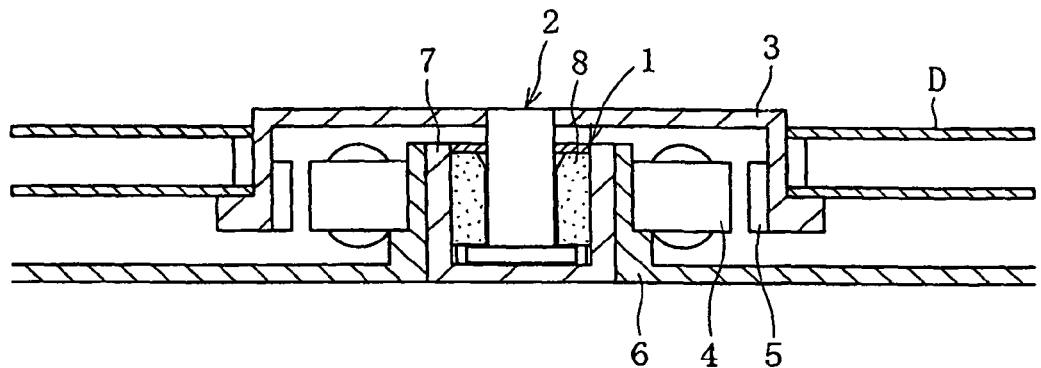
FIG. 1 is a sectional view of a spindle motor for an information apparatus into which a dynamic bearing device according to an embodiment of the present invention is incorporated.

FIG. 1 is a diagram conceptually showing a construction example of an information apparatus spindle motor into which the dynamic bearing device (i.e., fluid dynamic bearing device) 1 according to this embodiment is incorporated. The spindle motor is used in a disk drive apparatus, such as an HDD, and is equipped with: the dynamic bearing device 1 for rotatably supporting a shaft member 2 in a non-contact manner; a rotor (i.e., disk hub) 3 mounted to the shaft member 2; and a stator coil 4 and a rotor magnet 5 opposed to each other through the intermediation of, for example, a radial gap. The stator coil 4 is mounted to the outer periphery of a bracket 6, and the rotor magnet 5 is mounted to the inner periphery of the disk hub 3. A housing 7 of the dynamic bearing device 1 is fixed to the inner periphery of the bracket 6. One or a plurality of disks D such as magnetic disks are retained by the disk hub 3. When electricity is supplied to the stator coil 4, the rotor magnet 5 is rotated by an electromagnetic force generated between the stator coil 4 and the rotor magnet 5, and with this rotation, the disk hub 3 is rotated integrally with the shaft 2.

Figure 2:
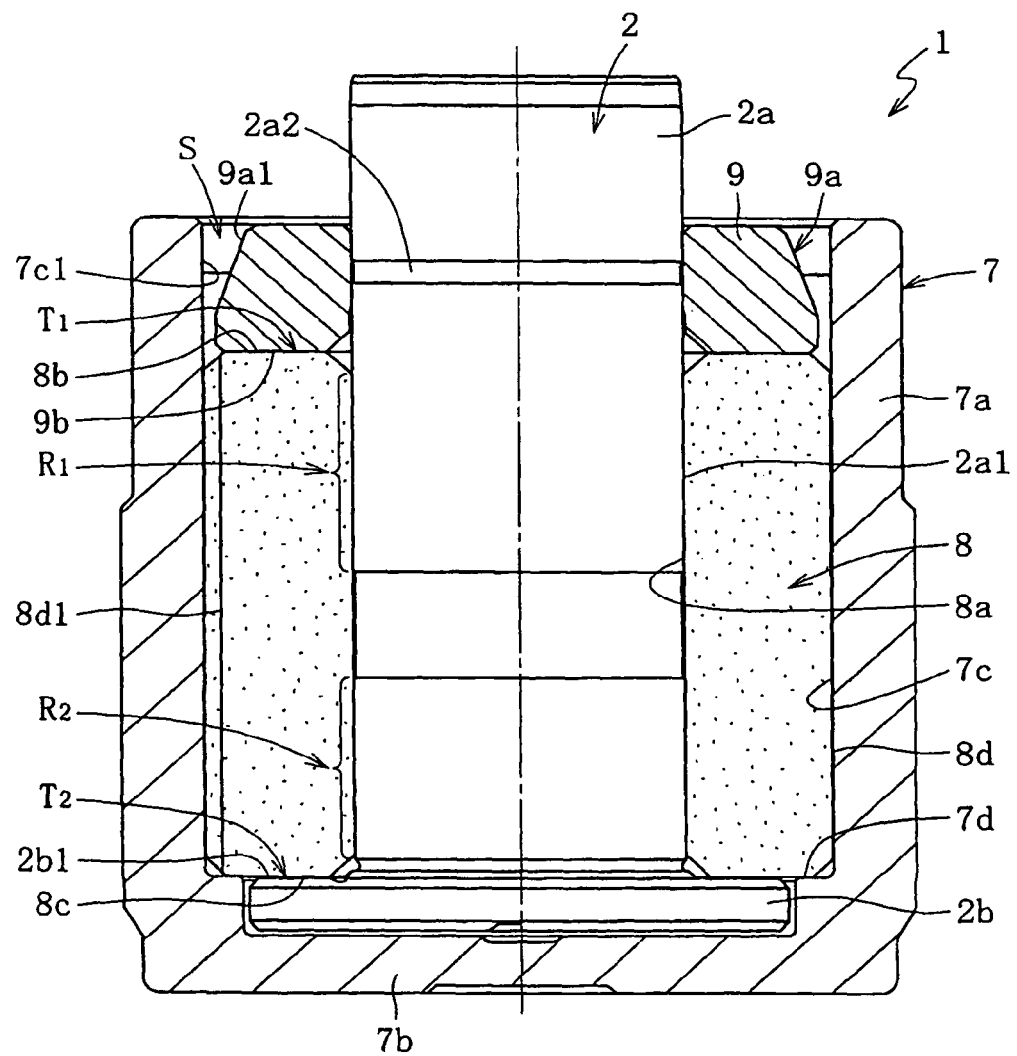
FIG. 2 is a sectional view of a dynamic bearing device according to a first embodiment of the present invention.

FIG. 2 shows the dynamic bearing device 1 of a first embodiment of the present invention. The dynamic bearing device 1 is composed of the housing 7, a bearing sleeve 8 fixed to the housing 7, the shaft member 2, and a seal member 9 fixed to the shaft member 2.

Between an inner peripheral surface 8a of the bearing sleeve 8 and an outer peripheral surface 2a1 of a shaft portion 2a of the shaft member 2, there are provided a first radial bearing portion R1 and a second radial bearing portion R2 which are axially spaced apart from each other. Further, a first thrust bearing portion T1 is provided between an upper end surface 8b of the bearing sleeve 8 and a lower end surface 9b of the seal member 9, and a second thrust bearing portion T2 is provided between a lower end surface 8c of the bearing sleeve 8 and an upper end surface 2b1 of a flange portion 2b of the shaft member 2. For the sake of convenience in illustration, in the following description, a side on which a bottom portion 7b of the housing 7 is situated will be referred to as the lower side, and a side on which an opening of the housing 7 is situated (i.e., side opposite to the bottom portion 7b) will be referred to as the upper side.

The housing 7 is formed as a bottomed cylinder, for example, by injection molding of a resin material, and is equipped with a cylindrical side portion 7a and the bottom portion 7b provided integrally at the lower end of the side portion 7a. Further, a step portion 7d is integrally formed at a position spaced apart axially upwards from an inner bottom surface of the bottom portion 7b by a predetermined dimension.

A resin forming the housing is mainly made of a thermoplastic resin; for example, it is possible to use an amorphous resin, such as polysulfone (PSF), polyether sulfone (PES), polyphenyl sulfone (PPSU), or polyether imide (PEI), or a crystalline resin, such as liquid crystal polymer (LCP), polyetherether ketone (PEEK), polybutyrene terephthalate (PBT), or polyphenylene sulfide (PPS). There are no particular limitations regarding the filler to be used for the above resin; for example, it is possible to use, as the filler, a fibrous filler, such as glass fiber, a whisker-like filler, such as potassium titanate, a scale-like filler, such as mica, or a fibrous or powdered conductive filler, such as carbon fiber, carbon black, graphite, carbon nanomaterial, or metal powder. These fillers may be used singly or in the form of a mixture of two or more them. This embodiment employs, as the material forming the housing 7, a resin material obtained by mixing 2 to 8 wt % of carbon fiber or carbon nanotube as the conductive filler with liquid crystal polymer (LCP) as the crystalline resin.

The shaft member 2 is formed, for example, of a metal material, such as stainless steel, or in a hybrid structure composed of metal and a resin, and is equipped with the shaft portion 2a and the flange portion 2b provided integrally or separately at the lower end of the shaft portion 2a. Further, in this embodiment, a recess, for example, a circumferential groove 2a2, is formed at a predetermined position of the outer peripheral surface 2a1 of the shaft portion 2a to which the seal member 9 is fixed.

The bearing sleeve 8 is formed as a cylinder of a porous material composed of a sintered metal, in particular, a porous material composed of a sintered metal whose main component is copper. The bearing sleeve 8 is fixed to a predetermined position of an inner peripheral surface 7c of the housing 7. It is also possible for the bearing sleeve 8 to be formed not only of the sintered metal, but also of some other metal material, which is not the porous material, for example, of a soft metal such as brass.

On an inner peripheral surface 8a of the bearing sleeve 8, there are provided axially separated upper and lower two regions constituting the respective radial bearing surfaces of the first radial bearing portion R1 and the second radial bearing portion R2. In the two regions, there are respectively formed dynamic pressure grooves 8a1 and 8a2 of a herringbone configuration as shown, for example, in FIG. 3. The upper dynamic pressure grooves 8a1 are formed axially asymmetrically with respect to an axial center m (i.e., axial center of the region between the upper and lower inclined groves), and an axial dimension X1 of the region on the upper side of the axial center m is larger than an axial dimension X2 of the region on the lower side of the axial center m. Further, in an outer peripheral surface 8d of the bearing sleeve 8, there is formed one or a plurality of axial grooves 8d1 extending over the entire axial length of the bearing sleeve. In this example, three axial grooves 8d1 are formed at constant intervals in a circumferential direction.

Figure 3:
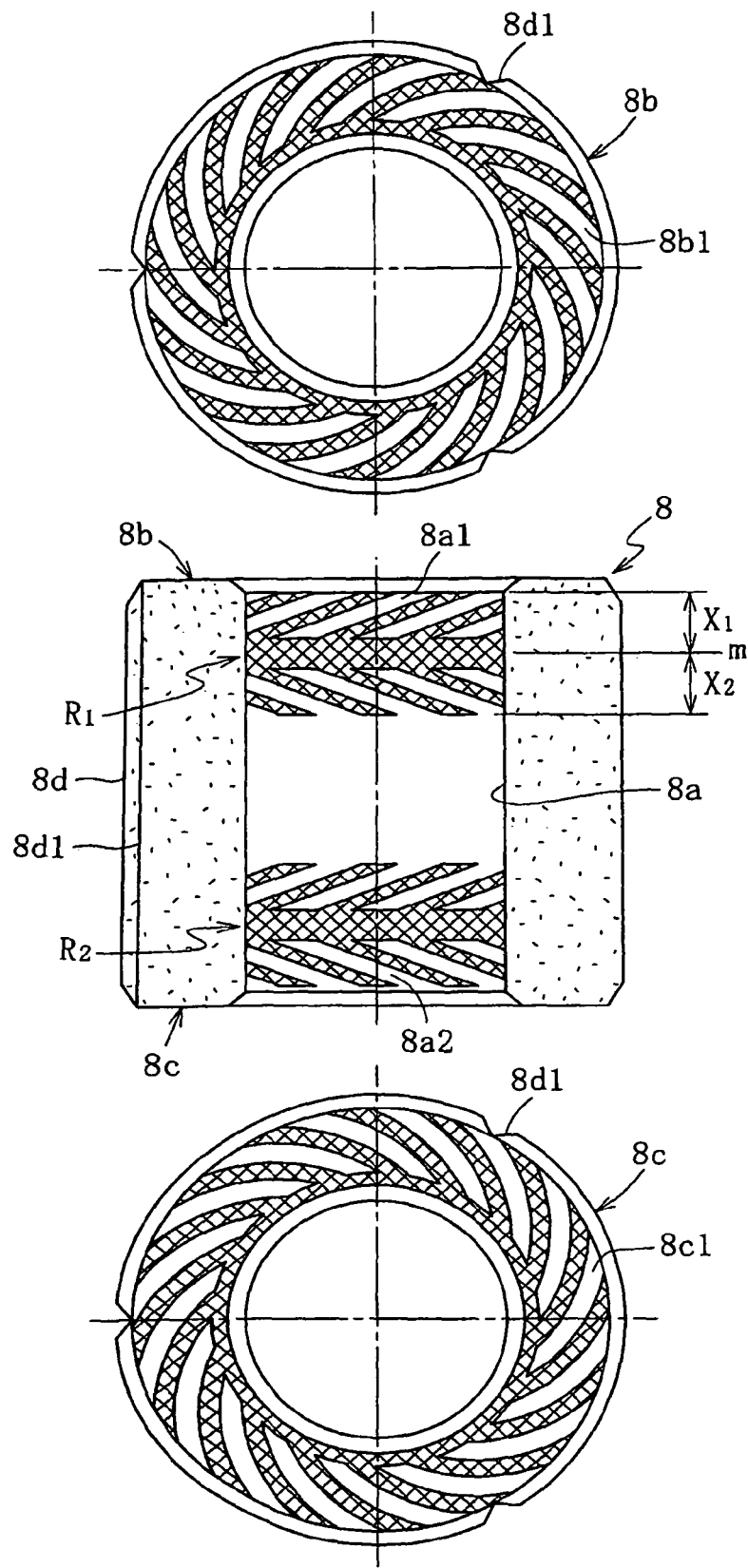
FIG. 3 is a sectional view of a bearing sleeve and diagrams showing a lower end surface and an upper end surface thereof.

Dynamic pressure grooves 8b1 of a spiral configuration as shown, for example, in FIG. 3, are formed in an upper end surface 8b of the bearing sleeve 8 constituting the thrust bearing surface of the first thrust bearing portion T1. Similarly, dynamic pressure grooves 8c1 of a spiral configuration as shown, for example, in FIG. 3, are formed in a lower end surface 8c of the bearing sleeve 8 constituting the thrust bearing surface of the second thrust bearing portion T2.

The seal member 9 is formed in a ring-like shape, for example, of a soft metal material, such as brass, or some other metal material, or a resin material, and is fixed, for example, by adhesive, to a predetermined position of the outer peripheral surface 2a1 of the shaft portion 2a. During rotation of the shaft member 2, a lower end surface 9b of the seal member 9 is opposed to the upper end surface 8b of the bearing sleeve 8 through the intermediation of a predetermined thrust bearing gap to form the first thrust bearing portion T1. An outer peripheral surface 9a of the seal member 9 forms between itself and an inner peripheral surface 7a1 of the upper end portion (i.e., opening) of the housing 7 a seal space S having a predetermined volume. The seal space S is formed beside the outer peripheral surface 9a of the seal member 9, so, in securing in the seal space S a volume capable of absorbing a change in volume due to a change in the temperature of the fluid filling the inner space of the housing 7, it is possible to make an axial dimension of the seal space S (i.e., the seal member 9) smaller than that in the prior art. Thus, it is possible, for example, to make the axial length of the bearing sleeve 8 larger than that in the prior art and transfer the axial center m of the dynamic pressure grooves 8a1 of the first radial bearing portion R1 to the upper end surface 8b side, or to make an axial dimension of the bearing sleeve 8 smaller than that in the prior art. When the former measure is taken, an axial distance between the axial center m of the dynamic pressure grooves 8a1 of the first radial portion R1 and the axial center of the dynamic pressure grooves 8a2 of the second radial bearing portion R2 increases, so it is possible to achieve an enhancement in the load capacity with respect to a moment load. On the other hand, when the latter measure is taken, it is possible to make the axial dimension of the dynamic bearing device smaller than that in the prior art.

In this embodiment, the outer peripheral surface 9a of the seal member 9 is equipped with a tapered surface 9a1 gradually diminished in diameter toward the exterior of the housing 7, so the seal space S exhibits a tapered configuration gradually diminished in size toward the interior of the housing 7. During rotation of the shaft member 2, the fluid in the seal space S is drawn in a direction in which the seal space S is narrowed (i.e., in a direction of the interior of the housing) by a drawing-in action due to capillary attraction and a drawing-in action due to a centrifugal force during the rotation. As a result, leakage of a lubricating oil from the interior of the housing 7 is effectively prevented.

The dynamic bearing device 1 of this embodiment is assembled, for example, by the following process.

Figure 4:
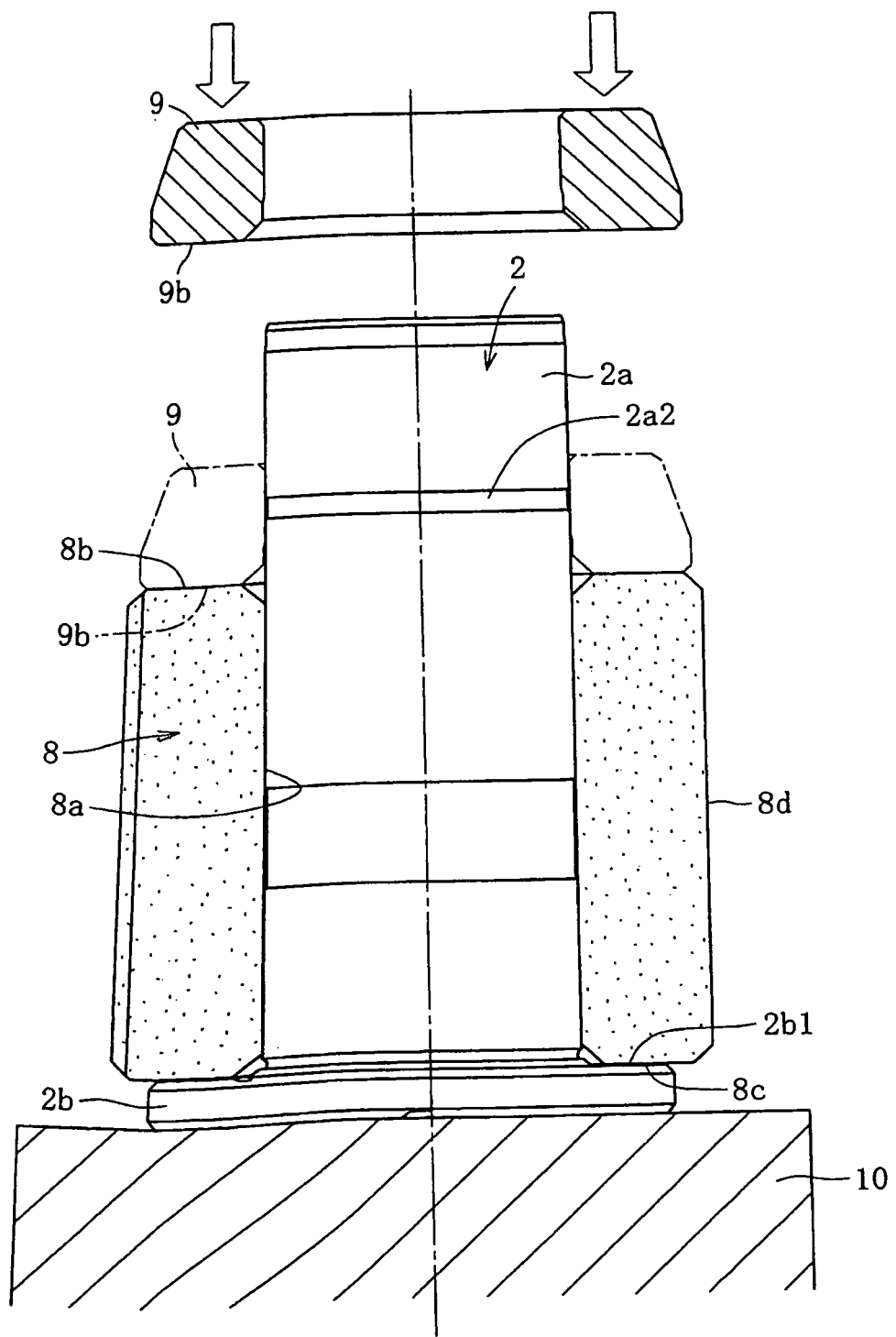
FIG. 4 is a diagram illustrating an assembly process.

First, the shaft member 2, the bearing sleeve 8, and the seal member 9 are assembled together. As shown, for example, in FIG. 4, the bearing sleeve 8 is attached to the shaft portion 2a of the shaft member 2 placed on the upper surface of a base 10, and the lower end surface 8c of the bearing sleeve 8 is brought into contact with the upper end surface 2b1 of the flange portion 2b. Then, after applying an adhesive, for example, a thermosetting adhesive, to the shaft portion 2a, the seal member 9 is attached to the shaft portion 2a, and the lower end surface 9b of the seal member 9 is brought into contact with the upper end surface 8b of the bearing sleeve 8, whereby the bearing sleeve 8 is interposed between the lower end surface 9b of the seal member 9 and the upper end surface 2b1 of the flange portion 2b.

Next, the thrust bearing gaps are set. The setting of the thrust bearing gaps is effected by adjusting the relative axial positions of the shaft member 2 and the seal member 9. For example, in the above-mentioned state, that is, in a state in which the lower end surface 8c of the bearing sleeve 8 is in contact with the upper end surface 2b1 of the flange portion 2b and the lower end surface 9b of the seal member 9 is in contact with the upper end surface 8b of the bearing sleeve 8

(i.e., state in which there is no thrust bearing gap), the shaft member 2 is caused to make a relative movement in the axial direction with respect to the bearing sleeve 8 and the seal member 9 by an amount corresponding to the sum total δ of the thrust bearing gap of the first thrust bearing portion T1 (indicated by symbol δ1) and the thrust bearing gap of the second thrust bearing portion T2 (indicated by symbol δ2) (=δ1+δ2).

Figure 5:
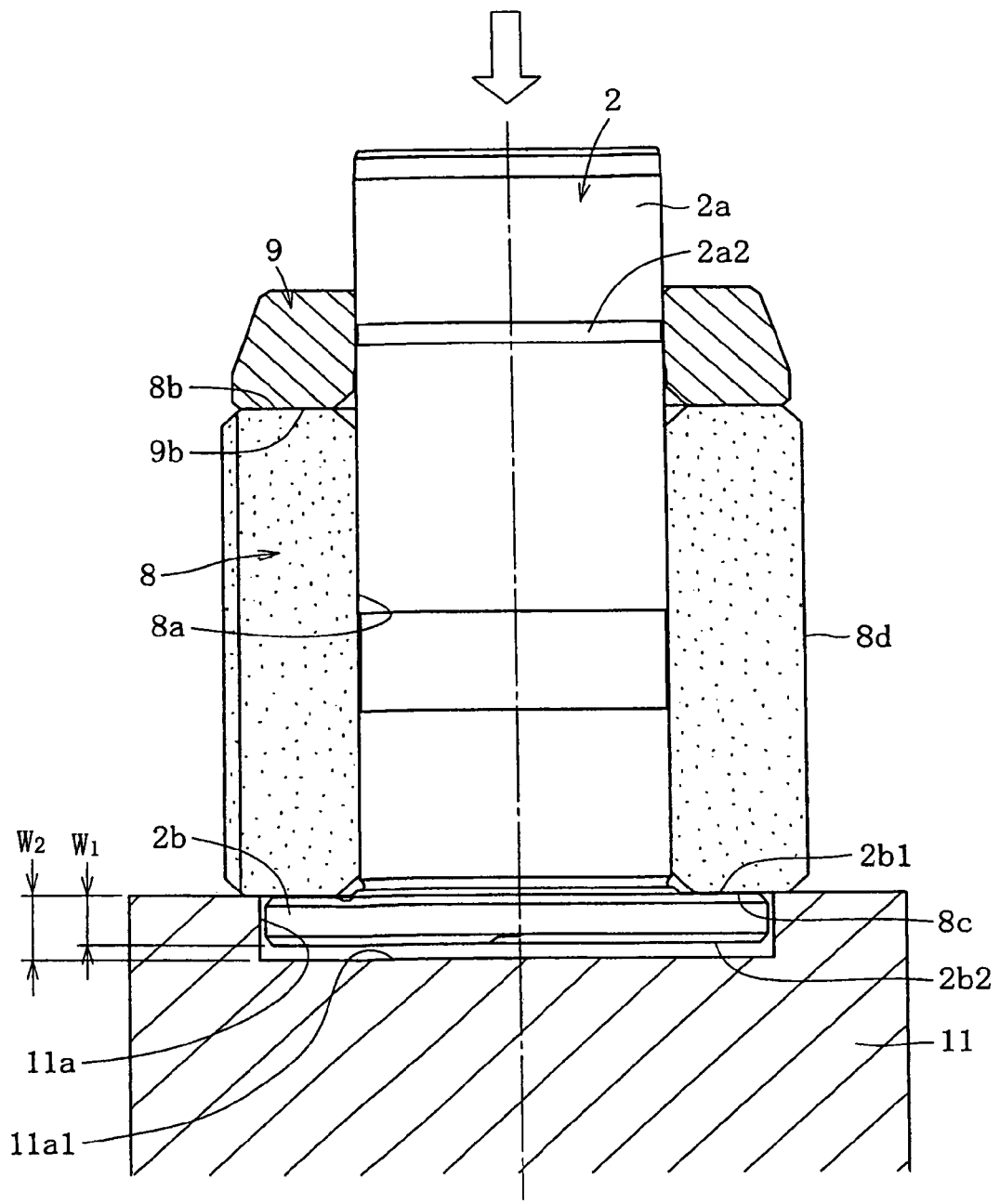
FIG. 5 is a diagram illustrating an assembly process.

To be more specific, as shown, for example, in FIG. 5, an assembly put together in the state as described above is placed on an upper surface of a jig 11 provided with a step portion 11a of a predetermined depth W2, with the lower end surface 8c of the bearing sleeve 8 being in contact with the upper surface of the jig 11 and the flange portion 2b being accommodated in the step portion 11a. In this state, the shaft member 2 is pressed from above to be allowed to make a relative movement in the axial direction with respect to the bearing sleeve 8 and the seal member 9 by the predetermined amount δ. In this case, when the depth W2 of the step portion 11a is accurately controlled with respect to an axial dimension W1 of the flange portion 2b such that a relationship of W2=W1+δ is obtained, it is possible to set the thrust bearing gap δ (=δ1+δ2) easily and with high accuracy solely by pushing the shaft member 2 forward until the lower end surface 2b2 of the flange portion 2b abuts a bottom surface 11a1 of the step portion 11a. Thus, the operation and device related to the setting of the thrust bearing gap are simplified. Alternatively, it is also possible to set the thrust bearing gap δ (=δ1+δ2) by setting the depth of the step portion such that a relationship of W2>W1+δ is obtained and by controlling an axial relative movement amount of the shaft member 2.

Alternatively, the setting of the thrust bearing gap can be effected by using as a reference the upper end surface 8b of the bearing sleeve 8 when the lower end surface 8c of the bearing sleeve 8 is in contact with the upper end surface 2b1 of the flange portion 2b and adjusting the axial position of the seal member 9 such that the lower end surface 9b of the seal member 9 is brought to a position where the lower end surface 9b is axially spaced apart from the upper end surface 8b by an amount corresponding to the above-mentioned sum total δ (=δ1+δ2). Such the positional adjustment in the axial direction of the seal member 9 can be effected easily and with high accuracy, for example, by allowing a spacer, whose width is accurately controlled to a dimension equal to the above-mentioned sum total δ, to be interposed between the upper end surface 8b of the bearing sleeve 8 and the lower end surface 9b of the seal member 9.

After setting the thrust bearing gap (δ) through adjustment of the axial relative position of the shaft portion 2 and the seal member 9, the seal member 9 is fixed to the shaft portion 2a at that position. In this embodiment, the seal member 9 is fixed by adhesion to the shaft portion 2a through heat treatment (baking) of the thermosetting adhesive applied to the shaft portion 2a. At this time, the adhesive applied to the shaft portion 2a also fills a circumferential groove 2a2 in the outer peripheral surface 2a1 and solidifies therein, whereby the adhesion strength for the seal member 9 with respect to the shaft member 2 is enhanced.

Next, as shown in FIG. 6, the assembly put together by the above process and composed of the shaft member 2, the bearing sleeve 8, and the seal member 9 is inserted into the inner peripheral surface 7c of the housing 7, and the lower end surface 8c is brought into contact with the step portion 7d of the housing 7; in this state, the outer peripheral surface 8d of the bearing sleeve 8 is fixed to the inner peripheral surface 7c of the housing 7. The fixation of the bearing sleeve 8 to the housing 7 can be effected by an appropriate means, such as adhesion, press-fitting, a combination of adhesion and press-fitting, or welding (such as ultrasonic welding). In the drawing, δ is considerably exaggerated in dimension.

When the assembly is completed as described above, the shaft portion 2a of the shaft member 2 is inserted into the inner peripheral surface 8a of the bearing sleeve 8, and the flange portion 2b is accommodated in the space portion between the lower end surface 8c of the bearing sleeve 8 and the inner bottom surface of the bottom portion 7b of the housing 7. Further, the seal space S having a predetermined volume is defined between the outer peripheral surface 9a of the seal member 9 and the inner peripheral surface 7a1 of the upper end portion of the housing 7. After that, the inner space of the housing 7 sealed by the seal member 9, inclusive of inner voids of the bearing sleeve 8, is filled with a fluid, such as a lubricating oil. An oil level of the lubricating oil is constantly maintained within a range of the seal space S.

During rotation of the shaft member 2, regions of the inner peripheral surface 8a of the bearing sleeve 8 constituting the radial bearing surfaces (i.e., two upper and lower regions) are respectively opposed to the outer peripheral surface 2a1 of the shaft portion 2a through the intermediation of a radial bearing gap. Further, a region of the upper end surface 8b of the bearing sleeve 8 constituting the thrust bearing surface is opposed to the lower end surface 9b of the seal member 9 through the intermediation of a thrust bearing gap, and a region of the lower end surface 8c of the bearing sleeve 8 constituting the thrust bearing surface is opposed to the upper end surface 2b1 of the flange portion 2b through the intermediation of a thrust bearing gap. As the shaft member 2 rotates, a dynamic pressure of the lubricating oil is generated in the radial bearing gap, and the shaft portion 2a of the shaft member 2 is supported radially and rotatably in a non-contact manner by an oil film of the lubricating oil formed in the radial bearing gap. As a result, there are formed the first radial bearing portion R1 and the second radial bearing portion R2 supporting the shaft member 2 radially and rotatably in a non-contact manner. At the same time, a dynamic pressure of the lubricating oil is generated in the thrust bearing gaps, and the shaft member 2 and the seal member 9 are supported rotatably in the thrust direction in a non-contact manner by oil films of the lubricating oil formed in the thrust bearing gaps. As a result, there are formed the first thrust bearing portion T1 and the second thrust bearing portion T2 supporting the shaft member 2 rotatably in the thrust direction in a non-contact manner. The thrust bearing gap (indicated by δ1) of the first thrust bearing portion T1 and the thrust bearing gap (indicated by δ2) of the second thrust bearing portion T2 are controlled accurately in the above-described assembly step such that a relationship of δ=δ1+δ2 is obtained, so it is possible to obtain a stable thrust bearing function.

Further, as described above, the dynamic pressure grooves 8a1 of the first radial bearing portion R1 are formed asymmetrically in the axial direction with respect to the axial center m, with the axial dimension X1 of the region on the upper side of the axial center m being larger than the axial dimension X2 of the region on the lower side thereof (see FIG. 3). Thus, during rotation of the shaft member 2, the lubricating oil drawing force (i.e., pumping force) due to the dynamic pressure grooves 8a1 is larger in the upper region than in the lower region. Due to this difference in drawing force, the lubricating oil filling the gap between the inner peripheral surface 8a of the bearing sleeve 8 and the outer peripheral surface 2a1 of the shaft portion 2a flows downwards, and circulates through the route: the thrust bearing gap of the second thrust bearing portion T2→the axial grooves 8d1→the thrust bearing gap of the first thrust bearing portion T1 before being drawn into the radial bearing gap of the first radial bearing portion R1 again. In this way, the lubricating oil flows and circulates through the inner space of the housing 7, whereby it is possible to prevent a phenomenon in which the pressure of the lubricating oil in the inner space locally becomes a negative pressure, making it possible to eliminate the generation of bubbles as a result of the generation of a negative pressure, and leakage of the lubricating oil, generation of vibration, etc. due to the generation of bubbles. Further, if, for some reason, bubbles are allowed to be mixed into the lubricating oil, the bubbles are discharged into the atmosphere through the oil surface (gas-liquid interface) of the lubricating oil in the seal space S when they circulate with the lubricating oil, so it is possible to more effectively prevent the adverse effects of the bubbles.

Further, the inward drawing force (i.e., pumping force) for the lubricating oil due to the dynamic pressure grooves 8b1 of the first thrust bearing portion T1 also acts on the lubricating oil in the radial bearing gap of the first radial bearing portion R1, so even if the above-mentioned difference in drawing force in the first radial bearing portion R1 is relatively small, it is possible to secure a satisfactory flowing circulation of the lubricating oil. As a result, it is possible to reduce the axial asymmetry of the dynamic pressure grooves 8a1 of the first radial bearing portion R1 as compared with that in the prior art; for example, it is possible to diminish the axial dimension X1 of the upper region of the dynamic pressure grooves 8a1 as compared with that in the prior art and transfer the axial center m of the dynamic pressure grooves 8a1 to the upper end surface 8b side, or to diminish the axial dimension of the bearing sleeve 8. When the former measure is taken, the axial distance between the axial center m of the dynamic pressure grooves 8a1 of the first radial bearing portion R1 and the axial center of the dynamic pressure grooves 8a2 of second radial bearing portion R2 increases, so it is possible to achieve an enhancement in the load capacity with respect to the moment load. On the other hand, when the latter measure is taken, it is possible to reduce the axial dimension of the dynamic bearing device as compared with that in the prior art.

Figure 7:
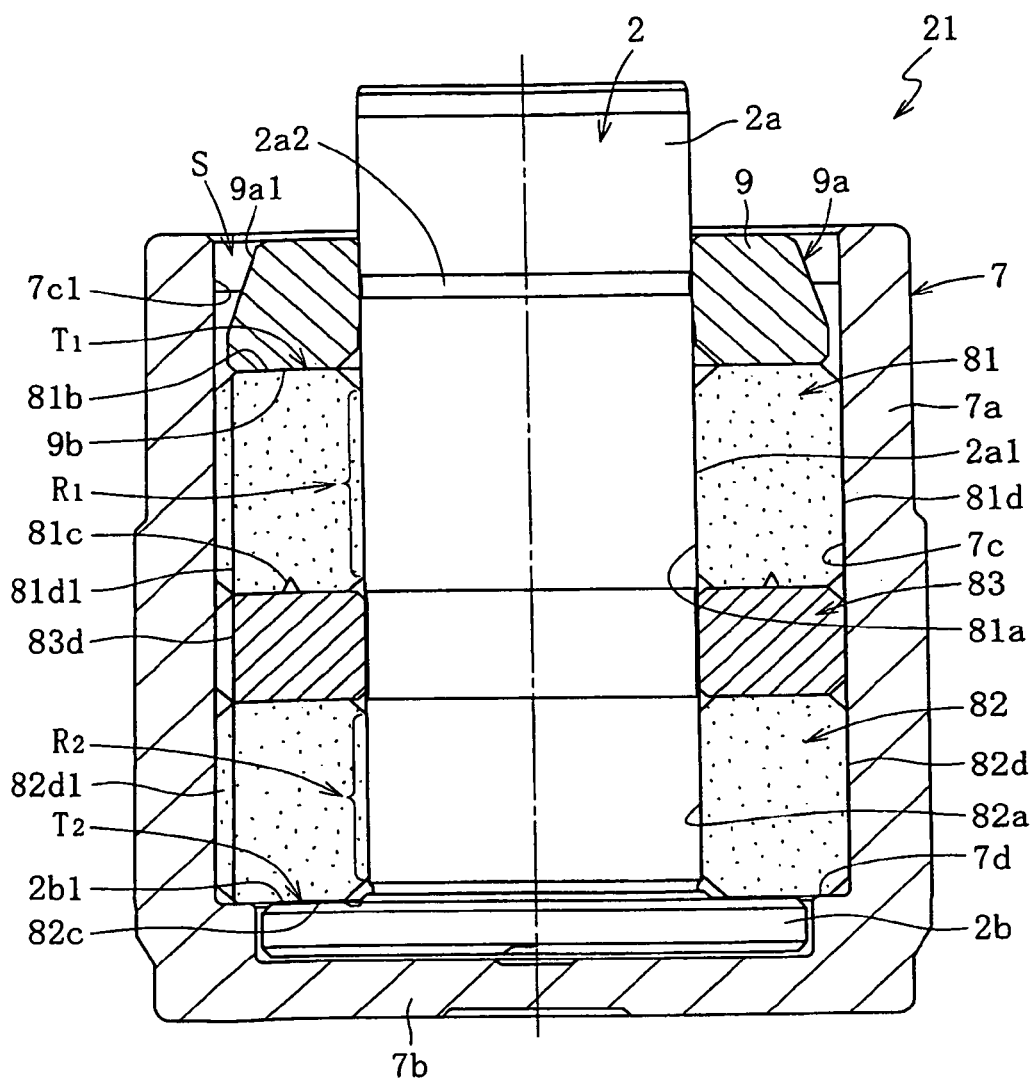
FIG. 7 is a sectional view of a dynamic bearing device according to a second embodiment of the present invention.

FIG. 7 shows a dynamic bearing device 21 according to a second embodiment of the present invention. The dynamic bearing device 21 of this embodiment differs from the dynamic bearing device 1 of the first embodiment described above in that the bearing sleeve is composed of an upper bearing sleeve 81 and a lower bearing sleeve 82, with a spacer member 83 being interposed between them. The spacer member 83 is formed in a ring-like shape of a soft metal material, such as brass, or some other metal material, or a resin material, and, unlike the upper bearing sleeve 81 and the lower bearing sleeve 82, has no porous texture.

The first radial bearing portion R1 is provided between an inner peripheral surface 81a of the upper bearing sleeve 81 and the outer peripheral surface 2a1 of the shaft portion 2a of the shaft member 2, and the second radial bearing portion R2 is provided between an inner peripheral surface 82a of the lower bearing sleeve 82 and the outer peripheral surface 2a1 of the shaft portion 2a. Further, the first thrust bearing portion T1 is provided between an upper end surface 81b of the upper bearing sleeve 81 and the lower end surface 9b of the seal member 9, and the second thrust bearing portion T2 is provided between a lower end surface 82c of the lower bearing sleeve 82 and the upper end surface 2b1 of the flange portion 2b of the shaft member 2. Formed in the lower end surface of the upper bearing sleeve 81 is an annular groove (i.e., V-groove) for distinguishing the upper bearing sleeve from the lower bearing sleeve 82. In an outer peripheral surface 81d of the upper bearing sleeve 81, an outer peripheral surface 82d of the lower bearing sleeve 82, and the outer peripheral surface of the spacer member 83, there are respectively formed one or a plurality of axial grooves 81d1, 82d1, and 83d which respectively extend over the entire axial lengths of the axial grooves. The axial grooves 81d1, 82d1, and 83d are formed in alignment in circumferential phase, and communicate axially with each other.

Since the spacer member 83 with no porous texture is interposed between the upper bearing sleeve 81 and the lower bearing sleeve 82, the total amount of lubricating oil filling the inner space of the housing 7 can be less than that in the dynamic bearing device 1 of the above-mentioned embodiment (for, the interior of the spacer member 83 is impregnated with no lubricating oil). On the other hand, the change in volume as a result of thermal expansion/contraction of the lubricating oil is proportional to the total amount of lubricating oil filling the inner space of the housing 7, so, due to the reduction in the total oil amount, it is possible to reduce the volume of the seal space S. Thus, in the dynamic bearing device 21 of this embodiment, it is possible to further reduce the axial dimension of the seal space S (thus, the seal member 9). Otherwise, this embodiment is the same as the first embodiment, so a redundant description thereof will be omitted.

Figure 8:
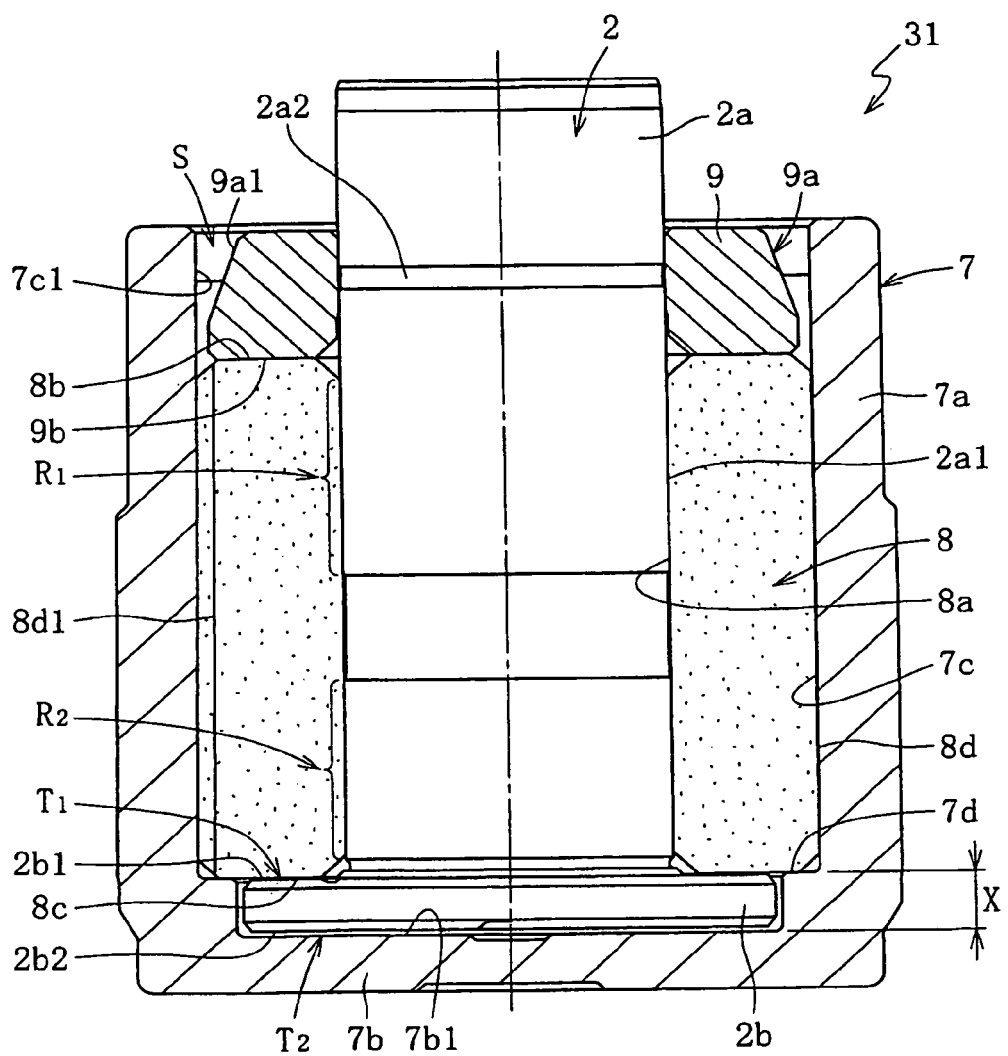
FIG. 8 is a sectional view of a dynamic bearing device according to a third embodiment of the present invention.

FIG. 8 shows a dynamic bearing device 31 according to a third embodiment of the present invention. The dynamic bearing device 31 of this embodiment differs from the dynamic bearing device 1 of the first embodiment in that the first thrust bearing portion T1 is provided between the lower end surface 8c of the bearing sleeve 8 and the upper end surface 2b1 of the flange portion 2b of the shaft member 2, and that the second thrust bearing portion T2 is provided between the inner bottom surface 7b1 of the bottom portion 7b of the housing 7 and the lower end surface 2b2 of the flange portion 2b.

Figure 10:
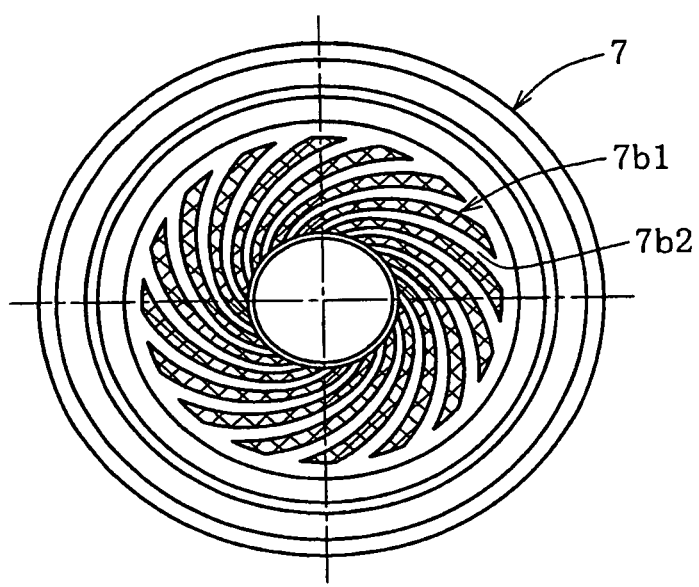
FIG. 10 is a top view of a housing.

As shown in FIG. 10, dynamic pressure grooves 7b2 of, for example, a spiral configuration, are formed in the inner bottom surface 7b1 of the bottom portion 7b constituting the thrust bearing surface of the second thrust bearing portion T2. The dynamic pressure grooves 7b2 are formed at the time of the injection molding of the housing 7. That is, a groove pattern for forming the dynamic pressure grooves 7b2 is formed by machining at a predetermined position (i.e., position where the inner bottom surface 7b1 is to be formed) of the mold for molding the housing 7, and the configuration of the groove pattern is transferred to the inner bottom surface 7b1 of the housing 7 at the time of the injection molding of the housing 7, whereby it is possible to form the dynamic pressure grooves 7b2 simultaneously with the molding of the housing 7. Further, the step portion 7d is integrally formed at a position spaced apart from the inner bottom surface (thrust bearing surface) 7b1 axially upwards by a predetermined distance x.

Further, as shown in FIG. 9, dynamic pressure grooves 8c1 of a spiral configuration as shown, for example, in FIG. 3(b), are formed in the lower end surface 8c of the bearing sleeve 8 constituting the thrust bearing surface, of the first thrust bearing portion T1. No dynamic pressure grooves are formed in the upper end surface 8b of the bearing sleeve 8. The upper end surface 8b of the bearing sleeve 8 is opposed to the lower end surface 9b of the seal member 9 through the intermediation of a gap larger than the thrust bearing gap.

The thrust bearing gap of the first thrust bearing portion T1 (indicated by symbol $\delta 1$) and the thrust bearing gap of the second thrust bearing portion T2 (indicated by symbol $\delta 2$) can be controlled with high accuracy such that a relationship of $x-w=\delta 1+\delta 2$ is obtained, where x is the axial dimension from the inner bottom surface 7b1 to the step portion 7d of the housing 7, and w is the axial dimension of the flange portion 2b of the shaft member 2.

In the third embodiment, when the second bearing portion T2 is formed by a so-called pivot bearing, the shaft member 2 used is one having no flange portion 2b (i.e., one with a straight configuration). In this case, it is also possible for the seal member 9 to be formed integrally with the shaft portion 2a of the shaft member 2. Otherwise, this embodiment is the same as the first embodiment, so a redundant description thereof will be omitted.

The above-mentioned embodiments adopt a construction in which a dynamic pressure action of a lubricant oil is generated by dynamic pressure grooves of a herringbone-like or a spiral configuration formed in the radial bearing portions R1, R2 and the thrust bearing portions T1, T2; the present invention, however, is not restricted to this construction.

For example, it is also possible to adopt a so-called step bearing or a multi-arc bearing as the radial bearing portions R1, R2.

Figure 11:
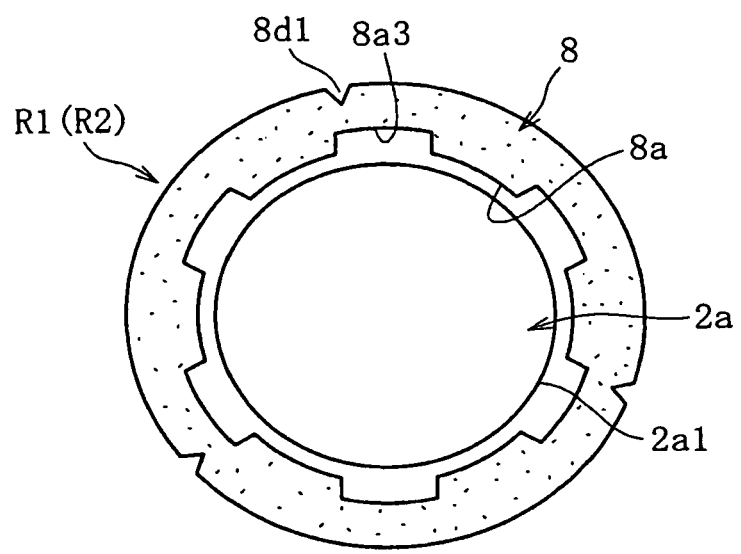
FIG. 11 is a sectional view of another example of a radial bearing portion.

FIG. 11 shows an example of a case in which one or both of the radial bearing portions R1, R2 are formed by step bearings. In this example, a plurality of dynamic pressure grooves 8a3 in the form of axial grooves are provided at predetermined circumferential intervals in the region of the inner peripheral surface 8a of the bearing sleeve 8 constituting the radial bearing surface.

Figure 12:
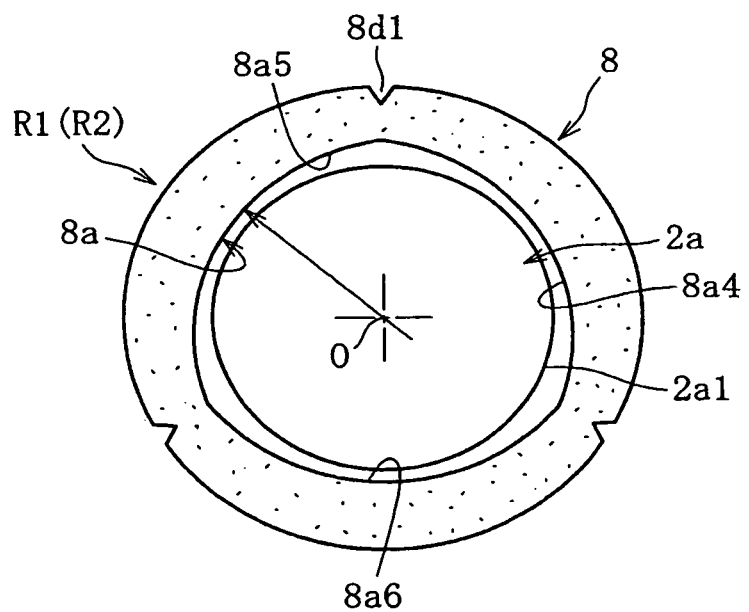
FIG. 12 is a sectional view of still another example of the radial bearing portion.

FIG. 12 shows an example of a case in which one or both of the radial bearing portions R1, R2 are formed by multi-arc bearings. In this example, the region of the inner peripheral surface 8a of the bearing sleeve 8 constituting the radial bearing surface is composed of three arcuate surfaces 8a4, 8a5, and 8a6 (i.e, so-called three-arc bearing). Respective centers of curvature of the three arcuate surfaces 8a4, 8a5, and 8a6 are offset by the same distance from the axial center O of the bearing sleeve 8 (i.e., the shaft portion 2a). In each of regions defined by the three arcuate surfaces 8a4, 8a5, and 8a6, the radial bearing gap has a configuration gradually diminished in a wedge-like fashion in both circumferential directions. Thus, when the bearing sleeve 8 and the shaft portion 2a make a relative rotation, the lubricating oil in the radial bearing gap is forced into the gradually diminished minimum gaps according to the direction of the relative rotation to undergo an increase in the pressure thereof. Due to the dynamic pressure action of the lubricating oil, the bearing sleeve 8 and the shaft portion 2a are supported in a non-contact manner. It is also possible to form, in the border portions between the three arcuate surfaces 8a4, 8a5, and 8a6, axial grooves called separation grooves, which are one step deeper.

Figure 13:
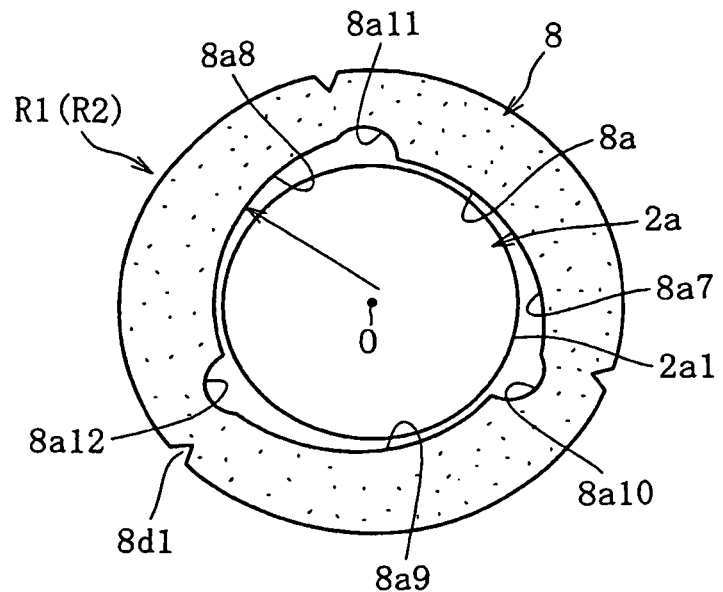
FIG. 13 is a sectional view of yet another example of the radial bearing portion.

FIG. 13 shows another example of the case in which one or both of the radial bearing portions R1, R2 are formed by multi-arc bearings. In this example also, the region of the inner peripheral surface 8a of the bearing sleeve 8 constituting the radial bearing surface is formed by three arcuate surfaces 8a7, 8a8, and 8a9 (i.e., so-called three-arc bearing); in each of regions defined by the three arcuate surfaces 8a7, 8a8, and 8a9, the radial bearing gap has a configuration gradually diminished in a wedge-like fashion in one circumferential direction. A multi-arc bearing of this construction is sometimes referred to as a tapered bearing. Further, in the border portions between the three arcuate surfaces 8a7, 8a8, and 8a9, there are formed axial grooves 8a10, 8a11, and 8a12 called separation grooves, which are one step deeper. Thus, when the bearing sleeve 8 and the shaft portion 2a make a relative rotation in a predetermined direction, the lubricating oil in the radial bearing gap is forced into a minimum gap diminished in wedge-like fashion to undergo an increase in the pressure thereof. Due to the dynamic pressure action of the lubricating oil, the bearing sleeve 8 and the shaft portion 2a are supported in a non-contact manner.

Figure 14:
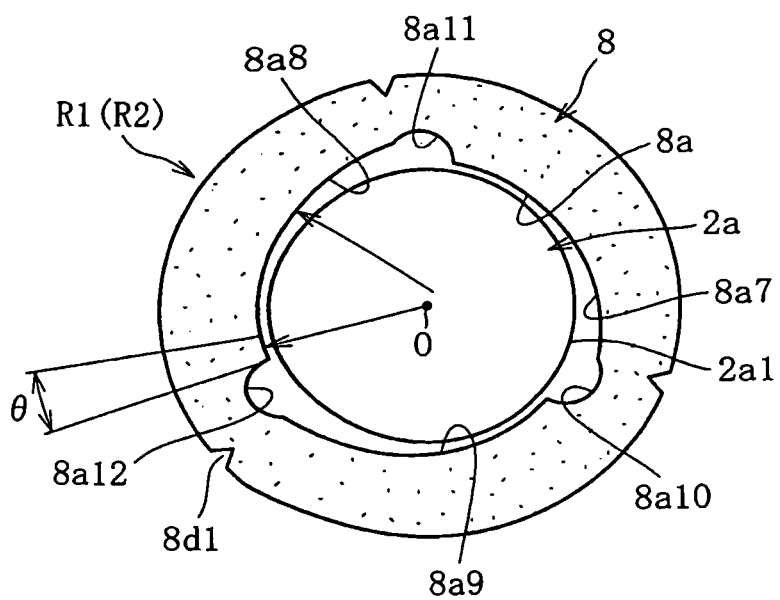
FIG. 14 is a sectional view of another example of the radial bearing portion.

FIG. 14 shows another example of the case in which one or both of the radial bearing portions R1, R2 are formed by multi-arc bearings. In this example, in the construction shown in FIG. 10, predetermined regions θ on the minimum gap side of the three arcuate surfaces 8a7, 8a8, and 8a9 are formed by concentric arcs whose center of curvature coincides with the axial center O of the bearing sleeve 8 (i.e., the shaft portion 2a). Thus, in each predetermined region θ, the radial bearing gap (i.e., minimum gap) is constant. A multi-arc bearing of this construction is sometimes referred to as a tapered flat bearing.

While the multi-arc bearings of the above-mentioned examples are so-called three-arc bearings, this should not be construed restrictively; it is also possible to adopt a so-called four-arc bearing, a five-arc bearing, and further, a multi-arc bearing formed by six or more arcuate surfaces. In the case in which the radial bearing portion is formed by a step bearing or a multi-arc bearing, it is possible to adopt, apart from the construction in which two radial bearing portions are axially spaced apart from each other as in the case of the radial bearing portions R1, R2, a construction in which one radial bearing portion is provided to extend over the vertical region of the inner peripheral surface 8a of the bearing sleeve 8.

Further, one or both of the thrust bearing portions T1, T2 may be formed, for example, by a so-called step bearing, a so-called wave-type bearing (with an undulated step pattern), etc., in which a plurality of dynamic pressure grooves in the form of radial grooves are provided at predetermined circumferential intervals in the region constituting the thrust bearing surface.

While in the above-mentioned embodiments a lubricating oil is used as the fluid filling the interior of the dynamic bearing device 1 and generating a dynamic pressure in the radial bearing gap between the bearing sleeve 8 and the shaft member 2 and in the thrust bearing gaps between the bearing sleeve 8, the shaft member 2, and the seal member 9, it is also possible to use some other fluid capable of generating a dynamic pressure in the bearing gaps, for example, a gas such as air, or a magnetic fluid.

Further, while in the above-mentioned embodiments the radial bearing surface is formed on the inner peripheral surface 8a of the bearing sleeve 8, it is also possible to form the radial bearing surface on the surface opposed thereto through the intermediation of the radial bearing gap, that is, on the outer peripheral surface 2a1 of the shaft portion 2a. Further, while in the above examples the thrust bearing surfaces having dynamic pressure grooves are formed on the end surfaces 8b, 8c of the bearing sleeve, it is also possible to form the thrust bearing surfaces on the surfaces opposed thereto through the intermediation of the thrust bearing gaps, that is, on the lower end surface 9b of the seal member 9 and on the upper end surface 2b1 of the flange portion 2b of the shaft member 2.

The invention claimed is:

1. A method of producing a dynamic bearing device which comprises
a housing,
a bearing sleeve to be fixed inside the housing,
a shaft member having a shaft portion to be inserted into a space defined by an inner peripheral surface of the bearing sleeve and a flange portion disposed integrally with the shaft portion,
a seal member to be fixed to the shaft member, a radial bearing portion to support the shaft member radially in a non-contact manner by dynamic pressure action of a fluid generated in a radial bearing gap between the inner peripheral surface of the bearing sleeve and an outer peripheral surface of the shaft member, a first thrust bearing portion to support the seal member and the shaft member in a thrust direction in a non-contact manner by dynamic pressure action of the fluid generated in a thrust bearing gap between an end surface of the seal member and a first end surface of the bearing sleeve, and a second thrust bearing portion to support the shaft member in the thrust direction in a non-contact manner by dynamic pressure action of the fluid generated in a thrust bearing gap between an end surface of the flange portion and a second end surface of the bearing sleeve, the method comprising:

inserting the shaft portion of the shaft member having the shaft portion and the flange portion disposed integrally with the shaft portion into the space defined by the inner peripheral surface of the bearing sleeve and attaching the seal member to the shaft portion to thereby interpose the bearing sleeve between the end surface of the seal member and the end surface of the flange portion;

bringing the first end surface of the bearing sleeve into direct contact with the end surface of the seal member and bringing the second end surface of the bearing sleeve into direct contact with the end surface of the flange portion;

adjusting an amount of a first end side gap between the first end surface of the bearing sleeve and the end surface of the seal member or a second end side gap between the second end surface of the bearing sleeve and the end surface of the flange portion, after said bringing of the first end surface of the bearing sleeve into direct contact with the end surface of the seal member and said bringing of the second end surface of the bearing sleeve into direct contact with the end surface of the flange portion, to an amount corresponding to a sum total of the thrust bearing gaps of the first thrust bearing portion and the second thrust bearing portion by moving the shaft member in an axial direction with respect to the bearing sleeve and the seal member;

fixing, after said adjusting of the amount of the first end side gap or the second end side gap, the seal member to the shaft portion; and accommodating an assembly including the bearing sleeve, the shaft member, and the seal member assembled together in the housing.

2. A method of producing a dynamic bearing device according to claim 1, wherein said adjusting of the amount of the first end side gap or the second end side gap comprises adjusting the amount of the first end side gap or the second end side gap to the amount corresponding to the sum total of the thrust bearing gaps using a jig with a step portion having a predetermined depth, and the predetermined depth is controlled to an amount corresponding to a summation of both the sum total of the thrust bearing gaps and an axial dimension of the flange portion.

3. A method of producing a dynamic bearing device according to claim 1, wherein the housing has a cylindrical side portion and an annular sealing portion that is integral with the cylindrical side portion.

4. A method of producing a dynamic bearing device according to claim 1, wherein said accommodating of the assembly comprises inserting the bearing sleeve, the shaft member, and the seal member assembled together, after said adjusting of the amount of the first end side gap or the second end side gap and said fixing of the seal member to the shaft portion, into the housing.

* * * * *